Patented Jan. 27, 1948

2,435,145

UNITED STATES PATENT OFFICE 2,435,145

METHOD FOR PRODUCING SOLID STABILIZED POLYSULPHIDES

André Lalande, Paris, France, assignor to Produits Chimiques de Ribecourt, Paris, France, a corporation of France and Compagnie de Produits Chimiques et Electrometallurgiques Alais, Froges et Camargue, Paris, France, a corporation of France No Drawing. Application April 23, 1945, Serial No. 589,937. In France January 28, 1942

4 Claims. (Cl. 167—20)

It is a well known fact that polysulphides in general and barium polysulphide in particular are adapted for agricultural purposes chiefly as insecticides and fungicides.

As generally known, barium polysulphides the formulae of which are comprised between $BaS_4$ and $BaS_5$ are easily obtained as solutions, for instance through the action of sulphur on barium sulphide in an aqueous medium. The evaporation of solutions thus prepared produces, under suitable conditions, solid products having a crystallized appearance and which are constituted at the very moment of their preparation by substantially pure polysulphides.

Unfortunately, the stability, in presence of air, of the solid polysulphides thus obtained is a very reduced one. The solid mass becomes hot spontaneously and gives birth to a mixture of sulphur, sulphate and oxysulphate together with a little carbonate in certain cases.

A number of methods have already been proposed for preventing such a degradation and for effecting the stabilisation of concentrated or solid preparations of barium polysulphides.

These prior methods apply inter alia the following means: formation of a pasty mixture of barium polysulphide and glycerine through elimination of water from a mixture of dissolved polysulphide and glycerine; a complete dehydration of polysulphide solutions in the absence of air in an inert atmosphere; addition of various salts and in particular of sulphocyanides to the polysulphides during the preparation of the latter and so on.

However said prior methods do not seem to have led to favourable industrial results.

The present invention allows on the contrary:

1. The stabilization of certain polysulphides and in particular of barium polysulphide by means of a simple method which does not require the use of an inert atmosphere;

2. The obtention of these polysulphides in a suitably subdivided state, for instance in the form of a coarse powder.

The method in accordance with the present invention is characterized by the fact that the water is eliminated in presence of a liquid which is not miscible with the polysulphide solution and the properties of which are such as will cause it to protect the polysulphide solution during the concentration process while its physical or chemical action on the solid polysulphide formed contributes to the stabilization thereof. Moreover, if some protective liquid remains in the final product, it does not impair and in some cases it may even improve the useful properties of said product.

Now I have found that alpha-monochloronaphthalene shows the properties required for allowing it to act as a protective medium and that its use is of particular advantage.

I will now proceed to describe a modus operandi which has proved satisfactory:

The aqueous solution of barium sulphide is first prepared in accordance with any of the usual methods. It is then submitted to concentration, under the action of heat, inside a receiver provided with mechanical stirring means and if required with suitable means for removing or collecting the gases capable of evolution. At the beginning of the concentration or once it is started, I introduce into the operating apparatus a liquid which is not miscible with water and possessing the above-defined properties, in order that it may properly impregnate the final product.

It is of advantage, without it being indispensable, to use an amount of liquid which leads, after elimination of the water, to the obtention of a paste which is sufficiently fluid for its manipulation to be easy. The water is then eliminated through heating.

When the protective agent possesses, as in the case of alpha-monochloronaphthalene, a sufficiently low vapour pressure, the vaporisation is performed at a temperature slightly above 100° C., without the vapours carrying off any substantial amount of protective reagent. There is sometimes observed a small evolution of sulphuretted hydrogen: 1% at the utmost of the sulphur worked up escapes under this form.

The vaporising is stopped at the moment when the temperature shows a sudden tendency to rise. The elimination of the water is then practically complete, sometimes with the accompaniment of a change in colour of the solid product which is in suspension in the protective agent, the colour changing from orange red to light brown. The solid product obtained is dried, say through centrifugation, before or after cooling.

The above-described apparatus and the protective liquid mentioned should be considered only as examples of a specific form of execution of my invention.

The stabilization of the polysulphides may be ascribed to the physical protection afforded to the grains by a layer of the inert reagent or else it may be due to a complete dehydration of the polysulphide, which dehydration is easily performed under the conditions considered; or again this stabilization may be produced by some other consequence of the treatment described. But, whatever the real reason of the efficiency of the treatment according to my invention may be, it should be well understood that said invention is by no means to be limited by such an explanation of its working. The following examples will disclose in a more precise manner different forms of execution of said invention and the characteristic data of certain products obtained thereby.

*Example 1.*—I heat to boiling point, inside the apparatus described hereinabove, a mixture of 1500 volume parts of a solution of barium polysulphide, the rough formula of which corresponds to the expression $BaS_{4.9}$ and the specific weight of which is approximately 35° Baumé (415 grammes of dry product per litre), with 500 volume parts of alpha-monochloronaphthalene. The vapours are condensed in a reflux condenser. The distillation of the mixture emulsified by the stirring means continues in a regular manner. The temperature remains practically constant in the vicinity of 103° C. until 1295 volume parts of water have been collected. The temperature then rises rapidly and when it reaches about 140° C., the heating is stopped. The elimination of the water is then practically complete. The solid product obtained is centrifuged while still hot.

Through the above-described method, the conditions of solubility and the chemical phenomena involved lead consantly to the production of polysulphides the formula of which is nearer $BaS_4$ than $BaS_5$. On the other hand, the hot alpha-monochloronaphthalene becomes loaded with sulphur which has a tendency to deposit at least in part when the alpha-monochloronaphthalene cools. Consequently if the solid polysulphide is mechanically separated from the alpha-monochloronaphthalene after a cooling of the latter, the final solid product obtained has a total sulphur content which may reach values corresponding to a formula very near $BaS_5$. When treated again by water, part of this sulphur is combined and passes into the state of polysulphide and part forms a more or less colloidal suspension.

The solid product obtained forming a coarse granular powder and appearing as a semi-crystalline product of a light brown, orange or yellow colour, has the following composition:

|  | Per cent |
|---|---|
| $BaS_{4.25}$ | 84 |
| $BaS_2O_3$ | 1.25 |
| Water-insoluble matter | 4.25 |
| Alpha-monochloronaphthalene (combined or impregnated) | 10.50 |

After 15 days of exposure to air of the solid product in the form of a thin layer, said product is easily dissolved in cold distilled water, forming an opalescent liquid. 81% (in weight) of the polysulphide worked up are soluble, the formula of the dissolved product corresponding still to $BaS_{4.25}$. Consequently the reduction in the useful contents of the product submitted to a very severe oxidising action amounts only to 3%.

After 25 days of a similar exposure to air, the water-soluble fraction of the polysulphide is still 80%. In other words the stabilisation of the product may be considered as complete as far as practical requirements and storing possibilities are concerned.

*Example 2.*—Similar results may also be obtained, even in open vats and with reduced stirring. The temperature of the liquid again stands at about 103° C. as long as any water remains and the end of the operation is easily ascertained by observing the rise in temperature. Besides this thermometric change, the completion of the reaction becomes clearly apparent through the change in the appearance of the mass.

The polysulphide, as it crystallizes through concentration when hot, forms first under the layer of alpha-monochloronaphthalene, a paste which thickens without its being deeply penetrated by the alpha-monochloronaphthalene and then it subdivides into elements which become smaller and smaller. Only at the end does the solid matter affect a finely granular appearance.

The characteristic data of the product obtained are very near those of the product obtained by operating as described in the case of Example 1; however the proportion of alpha-monochloronaphthalene reaches in this case about 13%. The stabilization is perfectly ensured also in the present case.

What I claim is:

1. A method for stabilizing barium polysulphide chiefly for insecticidal, fungicidal and the like agricultural purposes which comprises concentrating a solution of said polysulphide in water in presence of alpha-monochloronaphthalene until a granular powder is obtained.

2. A method for stabilizing barium polysulphide for agricultural purposes which comprises concentrating a mixture of a water solution of said polysulphide with alpha-monochloronaphthalene by vaporizing the water by heating at a temperature of about 103° C. while stirring said mixture, removing the product obtained when a temperature of about 140° C. is reached and removing the excess liquid from the product.

3. As a new composition of matter, primarily adapted for insecticidal, fungicidal and the like agricultural purposes, subdivided barium polysulphide impregnated with alpha-monochloronaphthalene.

4. As a new composition of matter, primarily adapted for insecticidal, fungicidal and the like agricultural purposes, a coarse granular powder consisting of subdivided barium polysulphide impregnated with alpha-monochloronaphthalene.

ANDRÉ LALANDE.

REFERENCES CITED

The following references are of record in the file of this patent:

UNITED STATES PATENTS

| Number | Name | Date |
|---|---|---|
| 305,423 | Cabot | Sept. 23, 1884 |
| 1,263,856 | Clark | Apr. 23, 1918 |
| 1,613,402 | Maxwell-Lefray | Jan. 4, 1927 |
| 2,077,856 | Rohm | Apr. 20, 1937 |

FOREIGN PATENTS

| Number | Country | Date |
|---|---|---|
| 434,914 | France | Dec. 11, 1911 |